L. P. LIGON.
LUBRICATING BEARING.
APPLICATION FILED FEB. 26, 1919.

1,369,896.

Patented Mar. 1, 1921.
2 SHEETS—SHEET 1.

WITNESS:

INVENTOR.
L. P. Ligon
BY Monroe E. Miller
ATTORNEY.

L. P. LIGON.
LUBRICATING BEARING.
APPLICATION FILED FEB. 26, 1919.

1,369,896.

Patented Mar. 1, 1921.
2 SHEETS—SHEET 2.

WITNESS:
Thos. W. Riley

INVENTOR.
L. P. Ligon
BY Monroe E. Miller
ATTORNEY.

UNITED STATES PATENT OFFICE.

LOTTIE P. LIGON, OF ROANOKE, VIRGINIA.

LUBRICATING-BEARING.

1,369,896.   Specification of Letters Patent.   Patented Mar. 1, 1921.

Application filed February 26, 1919. Serial No. 279,385.

*To all whom it may concern:*

Be it known that I, LOTTIE P. LIGON, a citizen of the United States, and resident of Roanoke, in the county of Roanoke and State of Virginia, have invented certain new and useful Improvements in Lubricating-Bearings, of which the following is a specification.

The present invention relates to journal boxes or bearings, and aims to provide novel improvements for locomotive driving boxes and other journal bearings in order to improve the lubrication of the brass and journal and to also compensate for irregular wear, maintain a uniform bearing, and prevent the journal from thumping in the brass.

The invention aims to provide efficient and simple means for lubricating the brass and journal of a journal box, and to also provide means for lubricating the wearing surfaces between the journal box and the shoes and wedges between which the journal box is slidable, the device also providing means for compensating for the irregular wear of the brass, and causing it to maintain a uniform bearing on the journal, as well as preventing the journal from thumping in the brass.

A further object is the provision of means for supplying lubricant should the ordinary source of lubricant from the cellar fail.

It is also an object of the invention to provide the aforesaid advantages in a journal box, in order that same can be incorporated in a simple and inexpensive manner, and to enhance the utility and efficiency of the construction.

With the foregoing and other objects in view which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing, wherein:—

An ordinary journal box 1 is illustrated as being provided with the present improvements, said journal box being of inverted U-shape so as to straddle and fit on the journal of the axle as usual, and it is to be understood that the illustration of the journal box is to be taken as conventional, because the improvements can be used in various bearings with equal propriety and success. The journal box 1 is provided with the opposite guide portions 2 to slidably engage the shoes and wedges as usual, and the brass 3 or bearing proper is fitted within the upper portion of the journal box 1 to seat on the journal astride it.

Figure 1:
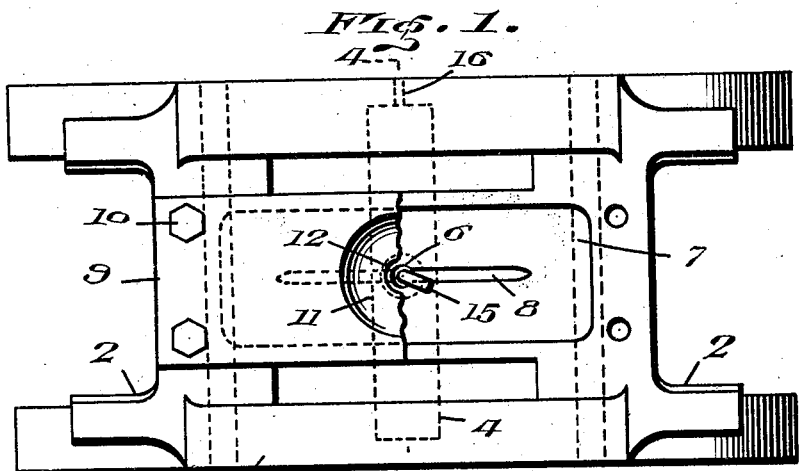
Figure 1 is a plan view of the journal box embodying the present improvements, a portion of the cover plate for the lubricant pocket being broken away.

In carrying out the invention, the brass 3 is provided in its lower surface and at the crest or top with a longitudinal cavity 4 of elongated or rectangular form, as seen in Fig. 1, and extending to points slightly short of the ends of the brass. This cavity 4 removes the upper portion of the brass sufficiently so that it is out of contact with the top of the journal, excepting the portions at the ends of the cavity 4, and this cavity will become filled with grease, which is elevated from the cellar, adhering to the journal and following it around so that it is caught in the cavity or recess 4 and collected therein, thus keeping said cavity full. Thus, a cavity or recess full of grease is disposed on top of the journal, providing for smooth action, and the brass will have a bearing surface on the journal that will compensate for irregular wear, due to the presence of the cavity. Furthermore, this will maintain a uniform bearing on the journal and will prevent the journal from thumping in the brass. By way of explanation, it may be stated that the brass 3 of a journal box on a locomotive, is subjected, first, to a practically constant load from above due to the weight imposed thereon, and, second, to intermittent loads of varying moment horizontally, due to the thrust of the connecting rod. In other words, the journal is shoved forwardly and rearwardly intermittently, in the brass, causing the sides of the brass to be gouged out or worn away, and inasmuch as the top of the brass does not wear away as quickly as the sides due to the constant vertical load imposed on the brass, this results in a lateral vibration of the journal in the brass, causing a thumping action which is objectionable. By the provision of the cavity 4 which removes a sufficient amount of the metal from above the journal, the upper portion of the brass will wear away much quicker, and just sufficient metal is removed so as to equalize the wear between the top and sides of the brass, so that the top of the brass will wear away at a sufficient amount to compensate for the wearing away of the sides, whereby the brass will settle on the journal and always fit snug thereon. If the cavity 4 is too small, then the desired function thereof will not be present, and if the cavity is too large, then the journal will simply cut its way upwardly in the brass which will also be objectionable. The cavity 4 is therefore of a size to equalize the wear between the portions of the brass which are subject to a constant load in one direction and an intermittent load of varying moment in another direction.

Figure 2:
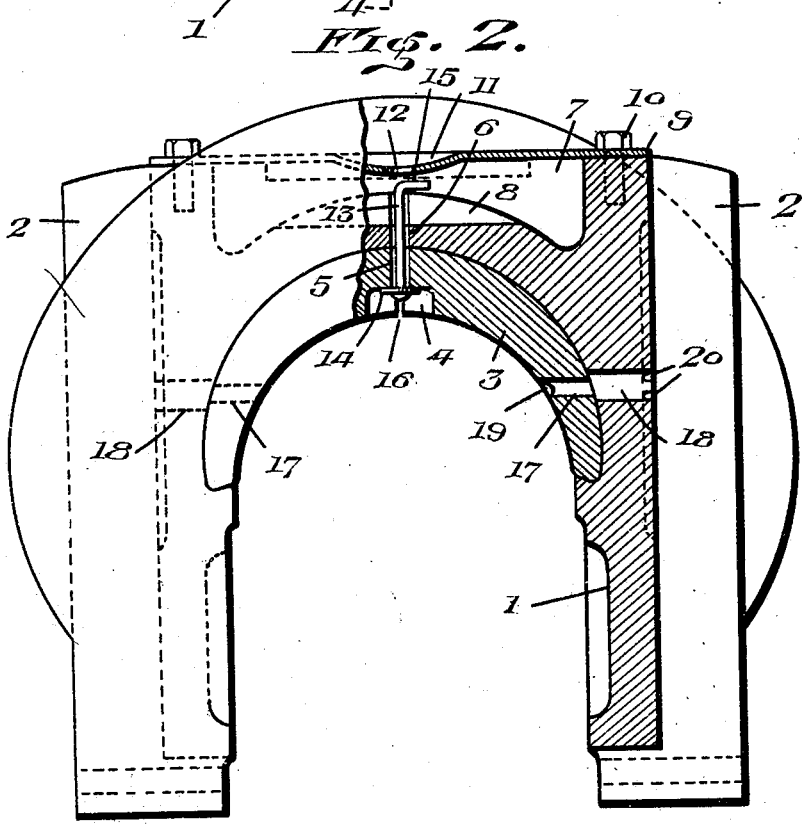
Fig. 2 is a side elevation of the journal box, portions being shown in section.

In order to supply lubricant to the cavity 4 when the supply of grease or lubricant therein is exhausted, the top portion of the brass 3 has a vertical aperture 5 registering with a similar aperture 6 in the top of the box 1, which aperture 6 communicates at its upper end with a lubricant pocket 7 in the top of the box. The bottom of the pocket 7 is convexed over the brass 3, as seen in Fig. 2, and a groove 8 extends across the bottom and intersects the aperture or bore 6, so that the lubricant can flow from the ends of the pocket 7 through the groove 8 to the aperture 6. This enables the pocket 7 to be of larger capacity than might otherwise be the case, without weakening the journal box. A cover plate 9 is secured on the box, by means of screws 10 or the like, to cover the lubricant pocket and prevent the lubricant from spilling therefrom, as well as protecting the lubricant from dirt and foreign matter. This cover plate 9 is provided with a central depression 11 over the apertures 5 and 6, and provided with a filling aperture 12. This facilitates filling the pocket 7, since the lubricant can be poured in the depression 11 to flow through the aperture 12.

A wire or stem 15 extends loosely through the apertures 5 and 6 which form the lubricant duct or passage, and said stem carries a disk or washer 14 at its lower end forming a valve seatable upwardly against the brass 3 to close the aperture 5, and the upper end of the stem 13 is extended angularly as at 15, to support said stem and enable it to move downwardly and upwardly slightly. When the cavity 4 is full of grease which is forced into the same under pressure from the journal, the pressure of the grease will hold the valve 14 seated, thereby preventing the grease from being forced up the lubricant duct, and this also prevents the lubricant from flowing from the pocket 7 when not needed as long as there is grease in the cavity 4. However, when the grease in the cavity 4 becomes exhausted, lubricant will flow from the pocket 7 down the lubricant duct into the cavity, the valve 14 dropping down to permit such flow. This will keep the cavity 4 supplied with lubricant, to prevent the bearing from becoming dry, until the supply of grease in the cellar is again replenished.

As means for supplying lubricant between the face of the journal box and hub liner of the wheel, one end of the brass 3 is provided with a narrow slot or groove 16 leading from one end of the cavity 4 to said end of the brass or the face of the journal box. Thus, lubricant will flow from said cavity to the slot to supply sufficient lubricant to the confronting bearing surfaces between the journal box and wheel or its hub liner, to keep said parts lubricated. It will be noted that the slot 6 is closed by the journal and hub liner, so that there is no escape of lubricant from the cavity 4, excepting as the parts become dry and the lubricant is carried from said slot 16.

Figure 3:
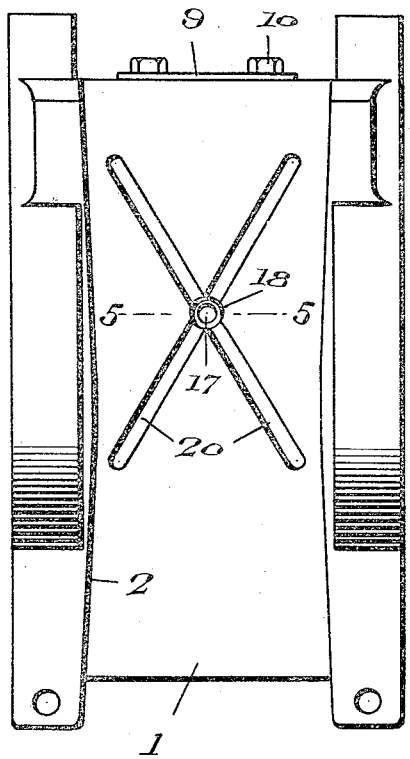
Fig. 3 is another side elevation, looking at right angles to the line of view in Fig. 2.
Figure 4:
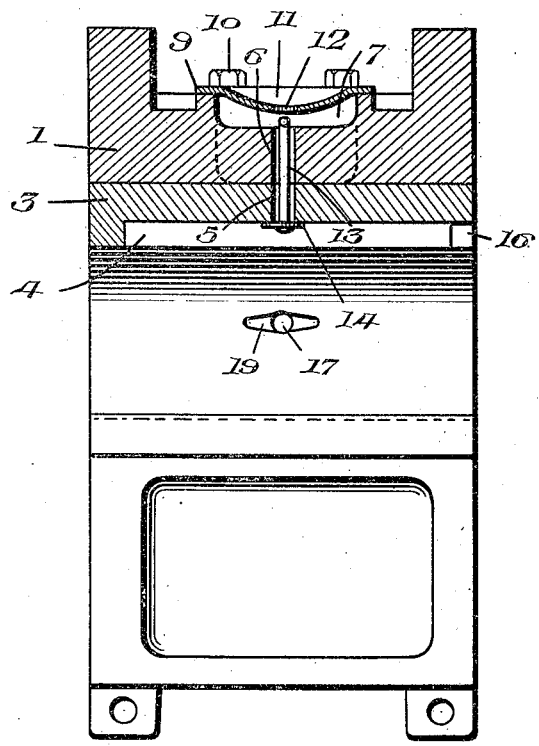
Fig. 4 is a section on the line 4—4 of Fig. 1.
Figure 5:
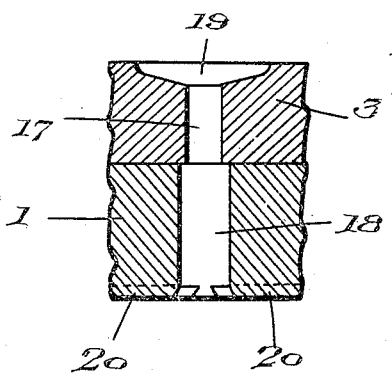
Fig. 5 is an enlarged sectional detail taken on the line 5—5 of Fig. 3.

Provision is also made for supplying lubricant to the wearing surfaces between the journal box and the shoes and wedges which guide it for vertical movement. Thus, the opposite sides of the brass 3 are provided with substantially horizontal apertures or bores 17 therethrough registering with similar apertures or bores 18 extending through the sides of the journal box, the inner surface of the brass having longitudinally elongated cavities or recesses 19 of relatively short length for catching grease from the journal so that it is forced under pressure into the apertures 17 and 18 to flow to the opposite wearing surfaces of the journal box. Said surfaces are provided with lubricant grooves 20 extending from the outer ends of the apertures or lubricant ducts toward the corners of the sides, as seen in Fig. 3, so that the lubricant will flow from the apertures 18 into the grooves 20, to be distributed throughout the wearing surfaces at the opposite sides of the journal box. This will keep the surfaces between the journal box and its guide well lubricated.

Having thus described the invention, what is claimed as new is:—

1. A journal box and its brass subject to one relatively constant load in one direction and an intermittent load of varying moment in a different direction, said brass having a recess in its bearing face of such a size to remove sufficient metal in the first named direction as to equalize the wear on the brass from both loads, said brass having a slot extending from one end of said recess to one end of the brass, said box and brass having a lubricant duct leading to said recess for filling said recess with lubricant, and a valve within said recess seatable upwardly by pressure from within said recess for preventing the reverse flow of lubricant from the recess into said duct.

2. A journal box and its brass to fit astride a journal, said brass having side portions to take up the lateral thrust of the journal and having a recess in its upper portion of a size to remove sufficient metal from above the journal to equalize the wear at the top and sides of the brass, said box and brass having a lubricant duct leading to said recess for supplying lubricant, and said box and brass having lubricant ducts leading from said side portions of the brass to the opposite sides of the box to supply lubricant to such sides of the box, and means for preventing the passage of lubricant from said recess back into the first named duct.

3. A journal box and its brass, the brass having a lubricant cavity at its inner surface, the box having a lubricant pocket above the brass, said box and brass having a lubricant duct leading downwardly from said pocket to said cavity, and an upwardly seating valve for said duct to be closed by pressure from within said cavity.

4. A journal box and its brass having a lubricant cavity at its inner surface at the top, and a lubricant duct extending upwardly from said cavity, and a valve within the cavity seatable upwardly therein to close said duct.

5. A journal box brass having a lubricant cavity at its inner surface at the top and a lubricant duct extending upwardly from said cavity, means for supplying lubricant to said duct to flow down into the cavity, and a valve within the cavity seatable upwardly to close said duct by pressure from within the cavity.

6. A journal box and its brass, the brass having a lubricant cavity at its inner surface, the box having a lubricant pocket above the brass, said box and brass having a lubricant duct leading downwardly from said pocket to said cavity, and a stem extending loosely through said duct and having means at its upper end for supporting it, and a valve at its lower end within the cavity seatable upwardly to close the lower end of said duct.

7. A journal box having a lubricant pocket in the top thereof provided with a convexed bottom over the brass, the box having a lubricant duct leading downwardly near the center of the pocket to supply the lubricant to the journal, and having a groove extending across the bottom and intersecting said duct.

8. A journal box having a lubricant pocket in its top and a lubricant duct leading downwardly from said pocket to supply lubricant to the journal, and a cover plate secured on the box over said pocket and having a depression above said duct provided with an aperture for filling the pocket with lubricant.

In testimony whereof I hereunto set my hand.

LOTTIE P. LIGON.